(12) United States Patent
Diab et al.

(10) Patent No.: US 9,450,818 B2
(45) Date of Patent: Sep. 20, 2016

(54) METHOD AND SYSTEM FOR UTILIZING A GATEWAY TO ENABLE PEER-TO-PEER COMMUNICATIONS IN SERVICE PROVIDER NETWORKS

(75) Inventors: Wael William Diab, San Francisco, CA (US); Jeyhan Karaoguz, Irvine, CA (US); Xuemin Chen, Rancho Santa Fe, CA (US); David Garrett, Tustin, CA (US); David Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 901 days.

(21) Appl. No.: 12/982,010

(22) Filed: Dec. 30, 2010

(65) Prior Publication Data

US 2011/0302313 A1 Dec. 8, 2011

Related U.S. Application Data

(60) Provisional application No. 61/351,696, filed on Jun. 4, 2010.

(51) Int. Cl.
*H04L 29/06* (2006.01)
*H04L 12/24* (2006.01)
(Continued)

(52) U.S. Cl.
CPC ........... *H04L 41/0816* (2013.01); *G05B 13/02* (2013.01); *G05F 1/66* (2013.01);
(Continued)

(58) Field of Classification Search
CPC ... H04L 12/56; H04L 65/102; H04L 65/103; H04L 65/1033; H04L 65/1036; H04L 12/6402; H04L 12/66

USPC ................................................ 709/238, 239
See application file for complete search history.

(56) References Cited

U.S. PATENT DOCUMENTS 6,516,345 B1 * 2/2003 Kracht .......................... 709/220
7,430,587 B2 * 9/2008 Malone ............... G06F 17/3089
707/999.003

(Continued)

OTHER PUBLICATIONS

Wei et al., "Towards efficient data distribution on computational desktop grids with BitTorrent" Laboratoire de Recherche en Informatique/INRIA Futurs Bat 490, Universit'e Paris Sud, 91405 Orsay Cedex, France, Available online Apr. 18, 2007, pp. 983-989.*

(Continued)

*Primary Examiner* — Le H Luu
(74) *Attorney, Agent, or Firm* — Foley & Lardner LLP; Christopher J. McKenna; Paul M. H. Pua

(57) ABSTRACT

A broadband gateway may be operable to receive network topology information to enable peer-to-peer communications between a first communication device and a second communication device. The first communication device is communicatively coupled to the broadband gateway. The broadband gateway may be operable to handle at least one physical layer connection to at least one corresponding network access service provider. A communication link which may bypass core layer network components and/or resources for enabling the peer-to-peer communications between the first communication device and the second communication device may be established by the broadband gateway, based on the received network topology information, a location of the first communication device and a location of the second communication device. The broadband gateway may establish the communication link to enable the peer-to-peer communications by marking traffic such as by inserting QinQ tags into traffic between the first communication device and the second communication device.

20 Claims, 6 Drawing Sheets

(51) Int. Cl.

| | | |
|---|---|---|
| H04W 12/08 | (2009.01) | |
| H04N 21/63 | (2011.01) | |
| H04L 29/08 | (2006.01) | |
| H04L 12/28 | (2006.01) | |
| G06F 21/62 | (2013.01) | |
| H04L 12/64 | (2006.01) | |
| G06Q 20/10 | (2012.01) | |
| H04L 12/857 | (2013.01) | |
| G06Q 30/02 | (2012.01) | |
| G06F 21/10 | (2013.01) | |
| G06Q 40/00 | (2012.01) | |
| G05B 13/02 | (2006.01) | |
| G05F 1/66 | (2006.01) | |
| G06Q 30/04 | (2012.01) | |
| H04L 12/14 | (2006.01) | |
| H04L 12/66 | (2006.01) | |
| H04N 5/445 | (2011.01) | |
| H04N 21/482 | (2011.01) | |
| H04N 21/436 | (2011.01) | |
| H04N 21/454 | (2011.01) | |
| H04N 21/6371 | (2011.01) | |
| H04N 21/6373 | (2011.01) | |
| H04N 21/472 | (2011.01) | |
| H04N 21/258 | (2011.01) | |
| H04N 21/6543 | (2011.01) | |

(52) U.S. Cl.
CPC .......... *G06F 21/10* (2013.01); *G06F 21/6245* (2013.01); *G06Q 20/10* (2013.01); *G06Q 30/0215* (2013.01); *G06Q 30/0226* (2013.01); *G06Q 30/04* (2013.01); *G06Q 40/12* (2013.12); *H04L 12/1453* (2013.01); *H04L 12/2801* (2013.01); *H04L 12/2838* (2013.01); *H04L 12/6402* (2013.01); *H04L 12/66* (2013.01); *H04L 29/06095* (2013.01); *H04L 41/32* (2013.01); *H04L 47/2491* (2013.01); *H04L 63/02* (2013.01); *H04L 63/0281* (2013.01); *H04L 63/10* (2013.01); *H04L 63/205* (2013.01); *H04L 65/102* (2013.01); *H04L 65/103* (2013.01); *H04L 65/1023* (2013.01); *H04L 65/1033* (2013.01); *H04L 65/1036* (2013.01); *H04L 65/40* (2013.01); *H04L 67/10* (2013.01); *H04L 67/104* (2013.01); *H04L 67/1078* (2013.01); *H04L 67/1095* (2013.01); *H04L 67/12* (2013.01); *H04L 67/16* (2013.01); *H04L 67/2842* (2013.01); *H04N 5/445* (2013.01); *H04N 21/43615* (2013.01); *H04N 21/454* (2013.01); *H04N 21/482* (2013.01); *H04N 21/632* (2013.01); *H04N 21/6371* (2013.01); *H04N 21/6373* (2013.01); *H04W 12/08* (2013.01); *G06F 2221/07* (2013.01); *H04L 41/5019* (2013.01); *H04L 65/4084* (2013.01); *H04L 2012/2849* (2013.01); *H04N 21/258* (2013.01); *H04N 21/47202* (2013.01); *H04N 21/6543* (2013.01); *Y02B 60/43* (2013.01)

(56) References Cited

U.S. PATENT DOCUMENTS

| | | | |
|---|---|---|---|
| 7,499,981 | B2* | 3/2009 | Harrow et al. .............. 709/217 |
| 7,920,572 | B2* | 4/2011 | Bates et al. ................ 370/395.2 |
| 2008/0168523 | A1* | 7/2008 | Ansari et al. ................ 725/131 |
| 2008/0255944 | A1* | 10/2008 | Shah et al. .................... 705/14 |
| 2009/0300673 | A1* | 12/2009 | Bachet et al. ................. 725/31 |

OTHER PUBLICATIONS

Qureshi, "Exploring Proximity Based Peer Selection in a BitTorrent-like Protocol" May 7, 2004, pp. 1-10.*

* cited by examiner

METHOD AND SYSTEM FOR UTILIZING A GATEWAY TO ENABLE PEER-TO-PEER COMMUNICATIONS IN SERVICE PROVIDER NETWORKS

CROSS-REFERENCE TO RELATED APPLICATIONS/INCORPORATION BY REFERENCE

This patent application makes reference to, claims priority to, and claims benefit from U.S. Provisional Application Ser. No. 61/351,696, which was filed on Jun. 4, 2010.

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010,
U.S. patent application Ser. No. 12/982,355 filed on Dec. 30, 2010,
U.S. patent application Ser. No. 12/981,971 filed on Dec. 30, 2010,
U.S. patent application Ser. No. 12/981,993 filed on Dec. 30, 2010,
U.S. patent application Ser. No. 12/982,216 filed on Dec. 30, 2010
U.S. patent application Ser. No. 12/982,433 filed on Dec. 30, 2010
U.S. patent application Ser. No. 12/982,205 filed on Dec. 30, 2010,
U.S. patent application Ser. No. 12/982,353 filed on Dec. 30, 2010
U.S. patent application Ser. No. 12/981,966 filed on Dec. 30, 2010,
U.S. patent application Ser. No. 12/982,453 filed on Dec. 30, 2010
U.S. patent application Ser. No. 12/982,172 filed on Dec. 30, 2010,
U.S. patent application Ser. No. 12/982,429 filed on Dec. 30, 2010
U.S. patent application Ser. No. 12/981,990 filed on Dec. 30, 2010,
U.S. patent application Ser. No. 12/982,442 filed on Dec. 30, 2010
U.S. patent application Ser. No. 12/982,010 filed on Dec. 30, 2010
U.S. patent application Ser. No. 12/982,022 filed on Dec. 30, 2010
U.S. patent application Ser. No. 12/981,986 filed on Dec. 30, 2010
U.S. patent application Ser. No. 12/982,236 filed on Dec. 30, 2010,
U.S. patent application Ser. No. 12/982,091 filed on Dec. 30, 2010
U.S. patent application Ser. No. 12/982,213 filed on Dec. 30, 2010
U.S. patent application Ser. No. 12/982,166 filed on Dec. 30, 2010
U.S. patent application Ser. No. 12/982,340 filed on Dec. 30, 2010,
U.S. patent application Ser. No. 12/982,073 filed on Dec. 30, 2010
U.S. patent application Ser. No. 12/982,501 filed on Dec. 30, 2010,
U.S. patent application Ser. No. 12/982,206 filed on Dec. 30, 2010
U.S. patent application Ser. No. 12/982,440 filed on Dec. 30, 2010,
U.S. patent application Ser. No. 12/982,171 filed on Dec. 30, 2010
U.S. patent application Ser. No. 12/982,223 filed on Dec. 30, 2010,
U.S. patent application Ser. No. 12/982,305 filed on Dec. 30, 2010,
U.S. patent application Ser. No. 12/982,477 filed on Dec. 30, 2010
U.S. patent application Ser. No. 12/982,331 filed on Dec. 30, 2010
U.S. patent application Ser. No. 12/982,036 filed on Dec. 30, 2010
U.S. patent application Ser. No. 12/982,196 filed on Dec. 30, 2010
U.S. patent application Ser. No. 12/982,391 filed on Dec. 30, 2010
U.S. patent application Ser. No. 12/982,405 filed on Dec. 30, 2010
U.S. patent application Ser. No. 12/981,753 filed on Dec. 30, 2010
U.S. patent application Ser. No. 12/982,414 filed on Dec. 30, 2010; and
U.S. patent application Ser. No. 12/981,753 filed on Dec. 30, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for utilizing a gateway to enable peer-to-peer communications in service provider networks.

BACKGROUND OF THE INVENTION

Telecommunication technologies have evolved from analog to digital technologies, and continues to evolve from circuit switched to packet switched, from connection oriented packet switching to connectionless packet switching, and from narrow band application to broadband applications. The accompanied evolution in telecommunication technologies has significantly advanced operators' capability to offer broadband, IP-based multimedia services ranging from entertainment and lifestyle applications such as mobile TV and mobile payment to professional services such as video conferencing and real-time data exchange.

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more display devices that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated equipments such as set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in home networks for the same purpose.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for utilizing a gateway to enable peer-to-peer communications in service provider networks, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
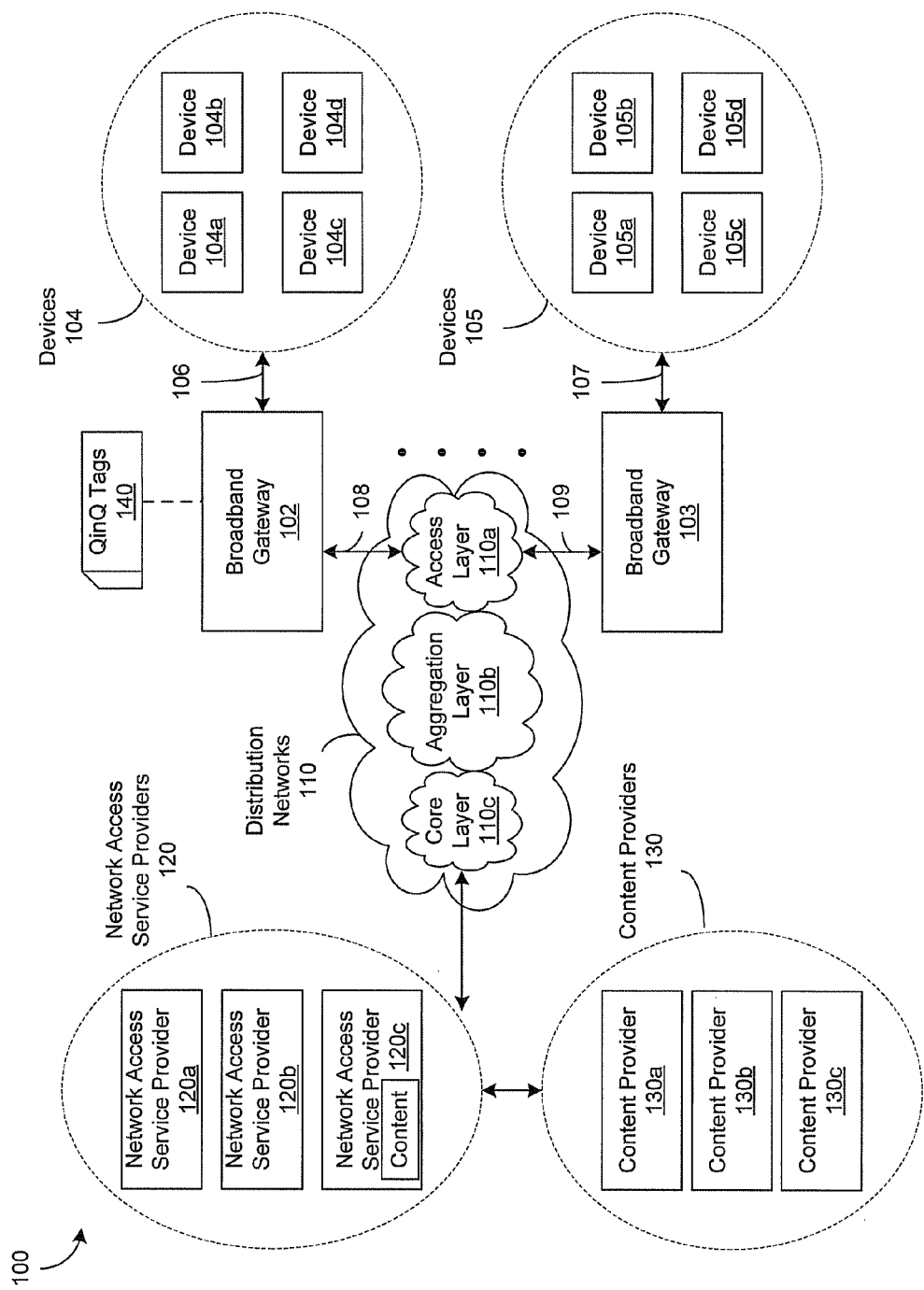
FIG. 1 is a block diagram illustrating an exemplary communication system that is operable to utilize a gateway to enable peer-to-peer communications in service provider networks, in accordance with an embodiment of the invention.

Certain embodiments of the invention can be found in a method and system for utilizing a gateway to enable peer-to-peer communications in service provider networks. In various embodiments of the invention, a broadband gateway, which handles at least one physical layer connection to at least one corresponding network access service provider, may be operable to receive network topology information to enable peer-to-peer communications between a first communication device and a second communication device. In this regard, the first communication device may be communicatively coupled to the broadband gateway. A communication link which may bypass core layer network components and/or resources to enable the peer-to-peer communications between the first communication device and the second communication device may be established by the broadband gateway, based on the received network topology information, a location of the first communication device and a location of the second communication device. In this regard, the communication link to enable the peer-to-peer communications may be established by marking traffic between the first communication device and the second communication device. For example, the communication link may be established by inserting tags into traffic between the first communication device and the second communication device. The network topology information may be received by the broadband gateway from one or more of the plurality of network access service providers and/or from one or more other broadband gateways, for example. The peer-to-peer communications may comprise, for example, content sharing, files sharing, video gaming and/or website hosting.

The at least one physical layer connection may comprise, for example, a plurality of physical layer connections and the at least one corresponding network access service provider may comprise a plurality of corresponding network access service providers. In this regard, each of the plurality of physical layer connections may correspond to a respective one of the plurality of corresponding network access service providers.

In an embodiment of the invention, the second communication device may also be communicatively coupled to the broadband gateway. In this regard, for example, the first communication device and the second communication device may both be associated with the same network access service provider. In other instances, the first communication device may be associated with a first network access service provider while the second communication device may be associated with a second network access service provider, for example.

In another embodiment of the invention, the second communication device may be communicatively coupled to one of other broadband gateways. In this regard, for example, the first communication device and the second communication device may both be associated with the same network access service provider. In other instances, the first communication device may be associated with a first network access service provider while the second communication device may be associated with a second network access service provider, for example.

FIG. 1 is a block diagram illustrating an exemplary communication system that is operable to utilize a gateway to enable peer-to-peer communications in service provider networks, in accordance with an embodiment of the invention. Referring to FIG. 1, there is shown a communication system 100. The communication system 100 may comprise a plurality of broadband gateways of which broadband gateways 102, 103 are illustrated, a plurality of distribution networks 110, a plurality of devices 104a-104d, 105a-105d, which are collectively referred to herein as devices 104 and 105 respectively, a plurality of network access service providers 120 of which network access service providers 120a-120c are illustrated and a plurality of content providers 130 of which content providers 130a-130c are illustrated. The devices 104a-104d may be serviced by the broadband gateway 102. The devices 105a-105d may be serviced by the broadband gateway 103.

A content provider such as the content provider 130a may comprise suitable logic, circuitry, interfaces and/or code that may be operable to generate, capture and/or package content such as, for example, multimedia content that may be distributed to one or more of the devices 104a-104d, 105a-105d via one or more of the network access service providers 120a-120c and the corresponding broadband gateways 102, 103. The content may be, for example, downloadable or streaming, and/or rented or purchased.

A network access service provider such as the network access service provider 120a may comprise suitable logic, circuitry, interfaces and/or code that may be operable to provide services using different access technologies to one or more of the devices 104a-104d, 105a-105d for end-users via the corresponding broadband gateways 102, 103. The services may include, but are not limited to, multimedia, television, Internet, phone, Ethernet, multimedia over coax alliance (MoCA), passive optical network (PON), and/or cellular services, for example. The network access service providers 120 may provide physical layer connections to the broadband gateways 102, 103. Such physical layer connections may then be utilized by the broadband gateways 102, 103 to access content provided by the content providers 130, to access services provided by other service providers, and/or to access an intranet or the Internet at-large. In this regard, "network access service provider" as utilized herein, is distinguished from the more generic term "service provider" which may encompass services other than providing physical layer access. Cable television (CATV) providers, plain old telephone service (POTS) providers, digital subscriber line (DSL) providers, cellular service providers, WiMAX providers and/or satellite providers are examples of the network access service providers 120. In some instances, a network access service provider such as the network access service provider 120c may be a provider that provides both content and services.

A broadband gateway such as the broadband gateway 102 may comprise suitable logic, circuitry, interfaces and/or code that may be operable to provide an interface and connectivity between one or more of the devices 104a-104d and one or more of the distribution networks 110. For example, the broadband gateway 102 may support configuring and/or using a plurality of broadband connections 108 to the distribution networks 110. The broadband connections 108 may comprise wired and/or wireless connections between the broadband gateway 102 and the distribution networks 110. In this regard, the broadband gateway 102 may be operable to perform and/or provide various services that may pertain to enabling and/or facilitating reception of content such as multimedia content from one or more of the content providers 130a-130c. The content may be delivered through one or more of the network access service providers 120. The broadband gateway 102 may communicate with various devices 104a-104d using wired, optical and/or wireless communication links 106. Similarly, the broadband gateway 103 may support configuring and/or using a plurality of broadband connections 109 to the distribution networks 110. The broadband gateway 103 may communicate with various devices 105a-105d using wired, optical and/or wireless communication links 107.

A single broadband gateway such as the broadband gateway 102 may be operable to handle a plurality of physical layer connections to the distribution networks 110, where different ones or portions of the distribution networks 110 may be owned, operated, leased or associated with different ones of the network access service providers 120. A physical layer may refer to an open systems interconnection (OSI) layer 1. In this regard, for example, a first network access service provider such as network access the service provider 120a may provide network access to the broadband gateway 102 via a DSL connection over twisted-pair cabling, and a second network access service provider such as the network access service provider 120b may provide network access to the broadband gateway 102 via a cable television connection over coaxial cabling. In some instances, the broadband gateway 102 may be operable to concurrently communicate over the plurality of physical layer connections provided by the plurality of network access service providers 120.

A broadband gateway such as the broadband gateway 102 may be located at a residential location such as a home. The broadband gateway 102 may also be located in non-residential location comprising, for example, a commercial building, an office, an office complex, an apartment building and/or a factory. While the broadband gateway 102 may be illustrated as a single and separate device in FIG. 1, the invention may not be so limited. In one embodiment of the invention, some functionalities of the broadband gateway 102 may be implemented in a distributed manner over two or more devices locally and/or remotely. For example, some of the functionalities of the broadband gateway 102 may be implemented within one of the televisions available in the home. Furthermore, the broadband gateway 102 may be implemented as a virtual platform, for example.

In an exemplary embodiment of the invention, the broadband gateway 102 may be operable to receive network topology information which may be associated with peer-to-peer communications between a first communication device such as the device 104a and a second communication device through one or more of the distribution networks 110. The second communication device may be, for example, a device such as the device 104b that is communicatively coupled to the broadband gateway 102 or a device such as the device 105a that is communicatively coupled to other broadband gateway such as the broadband gateway 103. The broadband gateway 102 may be operable to enable a communication link, which may be a path that bypasses core layer network components and/or resources, for the peer-to-peer communications between the first communication device such as the device 104a and the second communication device such as the device 105a. The communication link may be established by the broadband gateway 102 based on the received network topology information, a location or address of the first communication device 104a and a location or address of the second communication device such as the device 105a. The broadband gateway 102 may mark traffic between the first communication device 104a and the second communication device such as the device 105a for establishing the communication link. For example, the broadband gateway 102 may insert tags into the traffic between the first communication device 104a and the second communication device such as the device 105a for establishing the communication link.

A device such as the device 104a may comprise suitable logic, circuitry, interfaces and/or code that may be operable to interact with the broadband gateway 102. The devices 104a-104d serviced by, and/or connected with the broadband gateway 102 may comprise content consuming devices and/or non-content consuming household devices. For example, the devices 104 may comprise a television, a set-top box (STB), a laptop computer, a smoke detector, a carbon monoxide detector, a security alarm, a desk top computer and/or server, a mobile phone, a speaker, an AM/FM radio, a phone, and/or an appliance such as a refrigerator. The devices 104a-104d may interact with the broadband gateway 102 via the links 106 utilizing various wired and/or wireless communication technologies such as, for example, Bluetooth, LTE, WiFi and/or Ethernet. Similarly, the devices 105*a*-105*d* may interact with the broadband gateway 103 via the links 107 utilizing various wired and/or wireless communication technologies.

In an exemplary embodiment of the invention, a first communication device such as the device 104*a* and a second communication device such as the device 104*b* may both be associated with the same network access service provider such as the network access service provider 120*a*. In other instances, the device 104*a* may be associated with a first network access service provider such as the network access service provider 120*a* while the device 104*b* may be associated with a second network access service provider such as the network access service provider 120*b*, for example.

In another embodiment of the invention, a first communication device such as the device 104*a* and a second communication device such as the device 105*a*, which are communicatively coupled to the broadband gateway 103, may both be associated with the same network access service provider such as the network access service provider 120*a*. In other instances, the device 104*a* may be associated with a first network access service provider such as the network access service provider 120*a* while the device 105*a* may be associated with a second network access service provider such as the network access service provider 120*c*, for example.

In the exemplary embodiment of the invention illustrated in FIG. 1, although the devices 104*a*-104*d* communicate with only the broadband gateway 102 as shown and the devices 105*a*-105*d* communicate with only the broadband gateway 103 as shown, the invention may not be so limited. Accordingly, the devices 104*a*-104*d* may communicate with multiple broadband gateways in a local or home network and the devices 105*a*-105*d* may communicate with multiple broadband gateways in a local or home network without departing from the spirit and scope of various embodiments of the invention.

The distribution networks 110 may comprise suitable logic, circuitry, communication devices, interfaces and/or code that may be operable to enable wireless and/or wired communication among a plurality of local and/or remote entities, based on one or more networking and/or communication infrastructures. In this regard, one or more of the distribution networks 110 may be utilized to enable distribution of content such as multimedia content generated by one or more of the content providers 130*a*-130*c*, via one or more of the network access service providers 120*a*-120*c*, to one or more of the devices 104*a*-104*d*, 105*a*-105*d*. The network connectivity available via the distribution networks 110 may be based on one or more communication standards and/or protocols. The distribution networks 110 may comprise, for example, Internet, cable television (CATV) network, satellite television (TV) network, wired or wireless local area network (LAN), wired or wireless wide area network (WAN), personal area network (PAN) and/or cellular network.

A network topology associated with the distribution networks 110 may comprise an access layer 110*a*, an aggregation layer 110*b* and a core layer 110*c*. The access layer 110*a* may provide connections for end user communication devices such as the broadband gateways 102, 103 to the aggregation layer 110*b*. The access layer 110*a* may comprise repeaters, hubs and/or LAN switches, for example. The access layer 110*a* may ensure that packets are properly delivered to the end user communication devices such as the devices 104*a*-104*d*, 105*a*-105*d*, The aggregation layer 110*b* may provide connections between the access layer 110*a* and the core layer 110*c*. The aggregation layer 110*b* may comprise layer 2 and/or layer 3 network components such as layer 2 switches, layer 3 switches, multilayer switches and/or LAN routers, for example. The aggregation layer 110*b* may ensure that packets are properly routed to their destinations. The core layer 110*a* may be considered the backbone of the distribution networks 110 and may comprise high-sped network components and/or resources such as, for example, high-speed switches, routers, multiplexers and/or other high-speed communication devices. The core layer 110*c* may ensure that packets are reliably delivered with high speed.

In operation, a broadband gateway such as the broadband gateway 102 may be operable to handle a plurality of physical layer connections to a plurality of corresponding network access service providers such as the network access services providers 120*a*, 120*b*. The broadband gateway 102 may be operable to receive network topology information to enable peer-to-peer communications between a first communication device such as the device 104*a* and a second communication device through one or more of the distribution networks 110. The second communication device may be, for example, a device such as the device 104*b* that is communicatively coupled to the broadband gateway 102 or a device such as the device 105*a* that is communicatively coupled to other broadband gateway such as the broadband gateway 103. The network topology information may comprise, for example, at least a portion of physical layer properties that may be associated with network components and/or resources in the hierarchical network topology including access layer 110*a*, aggregation layer 110*b* and core layer 110*c*. In this regard, for example, the physical layer properties may comprise physical interconnections such as passive optical network (PON) interconnections associated with the network components and/or resources. A PON is a point-to-multipoint fiber interconnection architecture. A PON configuration may reduce the amount of fiber and associated equipments required compared with point-to-point architectures.

The broadband gateway 102 may receive the network topology information from, for example, one or more of the plurality of network access service providers 120*a*, 120*b* and/or one or more other broadband gateways such as the broadband gateway 103. In this regard, for example, the network topology information may be pushed down automatically by a network access service provider such as the network access service provider 120*a* to the broadband gateway 102. The broadband gateway 102 may send a request to a network access service provider such as the network access service provider 120*b* so as to receive the network topology information from the network access service provider 120*b*, for example. The broadband gateway 102 may learn at least a portion of the network topology information from one or more network components such as switches in the distribution networks 110 that may be associated with one or more network access service providers 120*a*-120*c*, for example. The network topology information pertaining to a network access service provider such as the network access service provider 120*c* which may be associated with the broadband gateway 103 may be obtained through the broadband gateway 103, for example. The peer-to-peer communications between the first communication device such as the 104*a* and the second communication device such as the device 105*a* may comprise, for example, sharing content such as multimedia content, sharing files such as data files, playing online video games and/or providing website services.

The broadband gateway 102 may be operable to establish a communication link which may bypass core layer network components and/or resources for enabling the peer-to-peer communications between the first communication device such as the device 104a and the second communication device such as the device 105a, based on the received network topology information, a location or address of the device 104a and a location or address of the device 105a. The location or address information associated with the device 104a and the device 105a may be provided by users of the device 104a and/or the device 105a. In this regard, the communication link, which is a peer-to-peer communication link, may be established in such a way that network resource usage, channel bandwidth usage and/or latency may be reduced during the peer-to-peer communications between the device 104a and the device 105a. For example, the device 104a may want to share content with the device 105a. Without the peer-to-peer communication link that may be established by the broadband gateway 102, the content may travel from the device 104a through network components and/or resources in the access layer 110a, the aggregation layer 110b and all the way up in the core layer 110c, and then travel back down to the device 105a through the network components and/or resources in the core layer 110c, the aggregation layer 110b and the access layer 110a. Based on the location or address information associated with the device 104a and the device 105a, the device 104a and the device 105a may be close to each other in the same region or neighborhood, for example. Based on the received network topology information, a peer-to-peer communication link or path between the device 104a and the device 105a within the aggregation layer 110b and/or the access layer 110a may be established without utilizing the network components and/or resources in the core layer 110c. With this peer-to-peer communication link that may be established by the broadband gateway 102, the content may travel among network components such as switches in the aggregation layer 110b and/or the access layer 110a without traveling through the network components and/or resources in the core layer 110c.

In an exemplary embodiment of the invention, the broadband gateway 102 may established the communication link to enable the peer-to-peer communications by marking traffic between the first communication device such as the device 104a and the second communication device such as the device 105a. The marking or tagging may be done utilizing, for example, the IEEE 802.1 QinQ specification. For example, the communication link may be established by inserting tags such as, QinQ tags 140 into the traffic between the device 104a and the device 105a. The IEEE 802.1 QinQ specification allows two or more tags (a tag stack) to be inserted into a single network frame such as an Ethernet frame. A double-tagged frame may comprise an inner tag and an outer tag. The outer tag may be used to identify and/or segregate traffic from different entities while the inner tag may be preserved from the original frame. In this regard, for example, based on the network topology information and the addresses associated with the device 104a and the device 105a, a frame in the traffic that is communicated between the device 104a and the device 105a may be marked or tagged in such a way that as a network component such as a switch in the access layer 110a and/or the aggregation layer 110b reads the tag in the frame, the network component or switch knows where to direct the frame to in the access layer 110a and/or the aggregation layer 110b.

In instances when a network component such as, for example, a layer 2 switch in the aggregation layer 110b becomes unavailable during a peer-to-peer communication, the tagged frames may be routed to one or more other available network components so as to maintain the peer-to-peer communication. In such an instance, the other available network component(s) may comprise, for example, a layer 2 switch and/or a layer 3 switch in the aggregation layer 110b.

In an embodiment of the invention, the second communication device may be a device such as the device 104b that is also communicatively coupled to the broadband gateway 102. In this regard, for example, the first communication device such as the device 104a and the second communication device such as the device 104b may both be associated with the same network access service provider such as the network access service provider 120a during the peer-to-peer communications. In other instances, during the peer-to-peer communications, the device 104a may be associated with a first network access service provider such as the network access service provider 120a while the device 104b may be associated with a second network access service provider such as the network access service provider 120b, for example.

In another embodiment of the invention, the second communication device may be a device such as the device 105a that is communicatively coupled to one of other broadband gateways such as the broadband gateway 103. In this regard, for example, the first communication device such as the device 104a and the second communication device such as the device 105a may both be associated with the same network access service provider such as the network access service provider 120a during the peer-to-peer communications. In other instances, during the peer-to-peer communications, the device 104a may be associated with a first network access service provider such as the network access service provider 120a while the device 105a may be associated with a second network access service provider such as the network access service provider 120c, for example.

Figure 2:
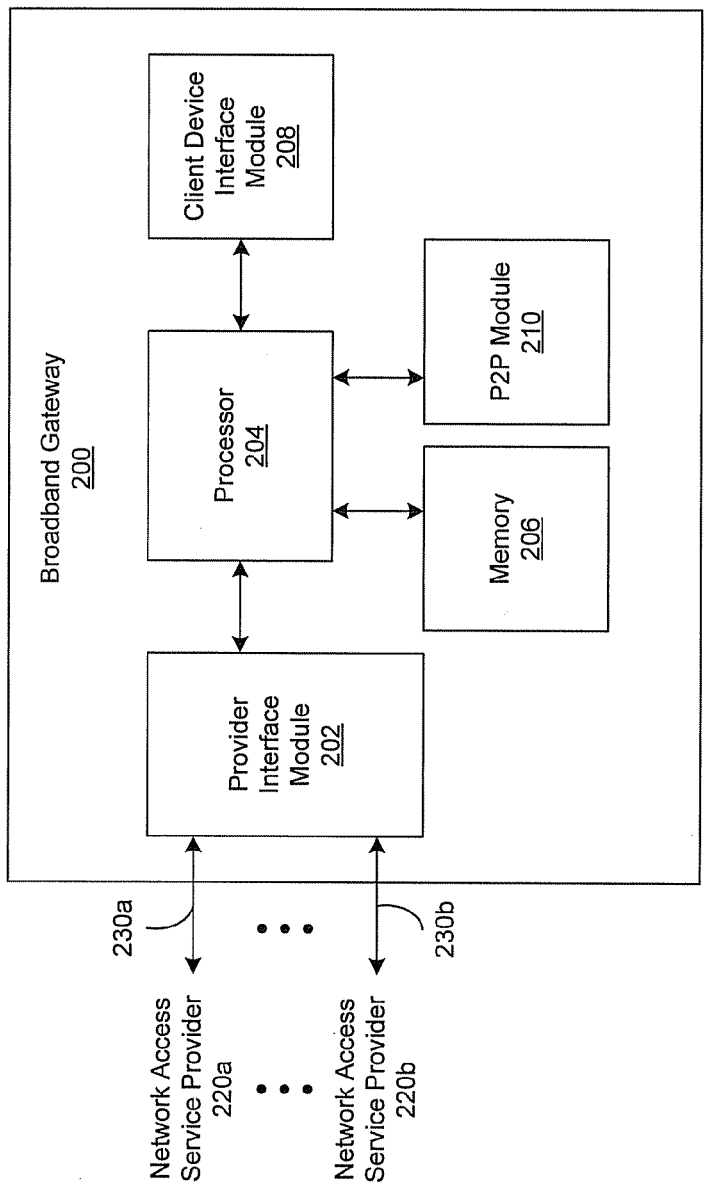
FIG. 2 is a block diagram illustrating an exemplary broadband gateway that is operable to enable peer-to-peer communications in service provider networks, in accordance with an embodiment of the invention.

FIG. 2 is a block diagram illustrating an exemplary broadband gateway that is operable to enable peer-to-peer communications in service provider networks, in accordance with an embodiment of the invention. Referring to FIG. 2, there is shown a broadband gateway 200. The broadband gateway 200 may be substantially similar to the broadband gateway 102 in FIG. 1. The broadband gateway 200 may comprise a provider interface module 202, a processor 204, a memory 206, a client device interface module 208 and a P2P module 210.

The provider interface module 202 may comprise suitable logic, circuitry, interfaces and/or code that may be operable to receive data from one or more network access service providers 220a-220b. The provider interface module 202 may also be operable to send data to one or more network access service providers 220a-220b. The provider interface module 202 may be operable to support multiple communication protocols, standards, and/or data transport technologies. The provider interface module 202 may be communicatively coupled to one or more network access service providers 220a-220b via one or more physical layer connections 230a-230b. In this regard, each of the physical layer connections 230a-230b may connect the broadband gateway 200 to one of different network access service providers 220a-220b. Each of the physical layer connections 230a-230b may comprise a wired, optical and/or wireless connection. For example, the physical layer connection 230a may comprise a DSL over twisted-pair connection while the physical layer connection 230b may comprise a CATV over coaxial cable connection.

The processor 204 may comprise suitable logic, circuitry, interfaces and/or code that may be operable to process data received from the network access service providers 220a-220b and/or the content providers 130a-130c and/or data received from one or more of the devices 104a-104d. In this regard, the processor 204 may comprise one or more portions that are suitable to handle certain types of data such as video data and/or audio data, for example.

The P2P module 210 may comprise suitable logic, circuitry, interfaces and/or code that may be operable to various functions for enabling and/or supporting peer-to-peer communications. In an exemplary embodiment of the invention, the P2P module 210 may be operable to receive network topology information which may enable peer-to-peer communications between a first communication device such as the device 104a and a second communication device. The second communication device may be, for example, a device such as the device 104b that is communicatively coupled to the broadband gateway 200 or a device such as the device 105a that is communicatively coupled to other broadband gateway such as the broadband gateway 103. The P2P module 210 may be operable to establish a communication link, which may comprise a communication path that bypasses core layer network components and/or resources. The established communication path may enable peer-to-peer communications between the first communication device such as the device 104a and the second communication device such as the device 105a. The communication link may be established by the P2P module 210 based on the received network topology information, a location or address of the device 104a and a location or address of the device 105a. The P2P module 210 may mark traffic between the device 104a and the device 105a using, for example, QinQ tags 140 for establishing the communication link for efficient peer-to-peer communications.

The memory 206 may comprise suitable logic, circuitry, interfaces and/or code that may be operable to store data utilized in the operations of the broadband gateway 200. For example, the memory 206 may be utilized to store configuration data, parameters, device information, tracking and/or monitoring information, security information, and intermediate processing data, for example. The memory 206 may comprise storage media integrated in the broadband gateway 200 and/or a removable storage device.

The client device interface module 208 may comprise suitable logic, circuitry, interfaces and/or code that may be operable to send data to one or more of the devices such as the devices 104a-104d in a local or home network. The client device interface module 208 may also be operable to receive data from one or more of the devices 104a-104d in the local or home network. The client device interface module 208 may be operable to support multiple communication protocols, standards, and/or data transport technologies.

In operation, a broadband gateway such as the broadband gateway 200 may provide connections and/or interfaces for various devices such as the devices 140a-140d to distribution networks such as the distribution networks 110. A P2P module 210 in the broadband gateway 200 may be operable to receive information network topology information that may enable peer-to-peer communications between a first communication device such as the device 104a and a second communication device. The second communication device may be, for example, a device such as the device 104b that is communicatively coupled to the broadband gateway 200 or a device such as the device 105a that is communicatively coupled to other broadband gateway such as the broadband gateway 103. The network topology information may comprise at least a portion of physical layer properties such as, for example, PON interconnections associated with network components and/or resources in the hierarchical network topology with access layer, aggregation layer and core layer. The processor 204 may receive the network topology information from, for example, one or more of the plurality of network access service providers 220a-220b and/or one or more other broadband gateways such as the broadband gateway 103.

The P2P module 210 may be operable to establish a communication link or path which may bypass core layer network components and/or resources to enable the peer-to-peer communications between the first communication device such as the device 104a and the second communication device such as the device 105a, based on the received the network topology information, a location or address of the device 104a and a location or address of the device 105a. For example, the device 104a may want to send a video file to the device 105a. Without the peer-to-peer communication link that may be established by the P2P module 210, the video file may travel from the device 104a through network components and/or resources in the access layer such as the access layer 110a, the aggregation layer such as the aggregation layer 110b and all the way up in the core layer such as the core layer 110c, and then travel back down to the device 105a through the network components and/or resources in the core layer 110c, the aggregation layer 110b and the access layer 110a. With the established peer-to-peer communication link, the video file may be delivered among network components such as switches in the aggregation layer 110b and/or the access layer 110a without travelling through the network components and/or resources in the core layer 110c.

In an exemplary embodiment of the invention, the P2P module 210 may establish the communication link to enable the peer-to-peer communications by marking traffic between the first communication device such as the device 104a and the second communication device such as the device 105a. For example, the P2P module 210 may establish the communication link by inserting tags such as, QinQ tags 140 into the traffic between the device 104a and the device 105a. In this regard, for example, a frame of a shared video file in the traffic between the device 104a and the device 105a may be tagged with QinQ tags 140 by the processor 204 in such a way that as a network component such as a switch in the access layer 110a and/or the aggregation layer 110b reads the tag in the frame, the network component or switch knows where to direct the frame to in the access layer 110a and/or the aggregation layer 110b.

Figure 3A:
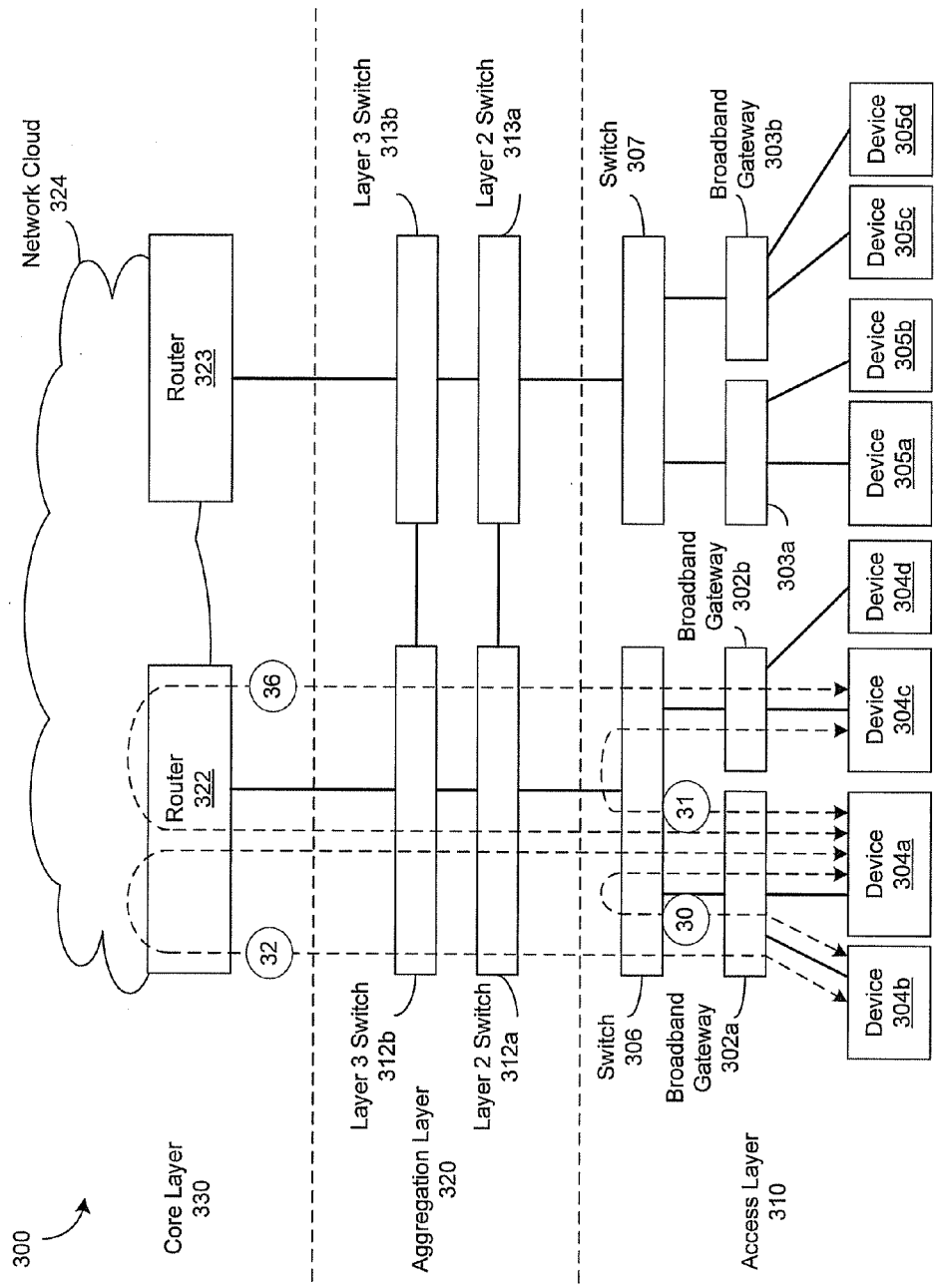
FIGS. 3A-3B are block diagrams that illustrate exemplary peer-to-peer communications, in accordance with embodiments of the invention.
Figure 3B:
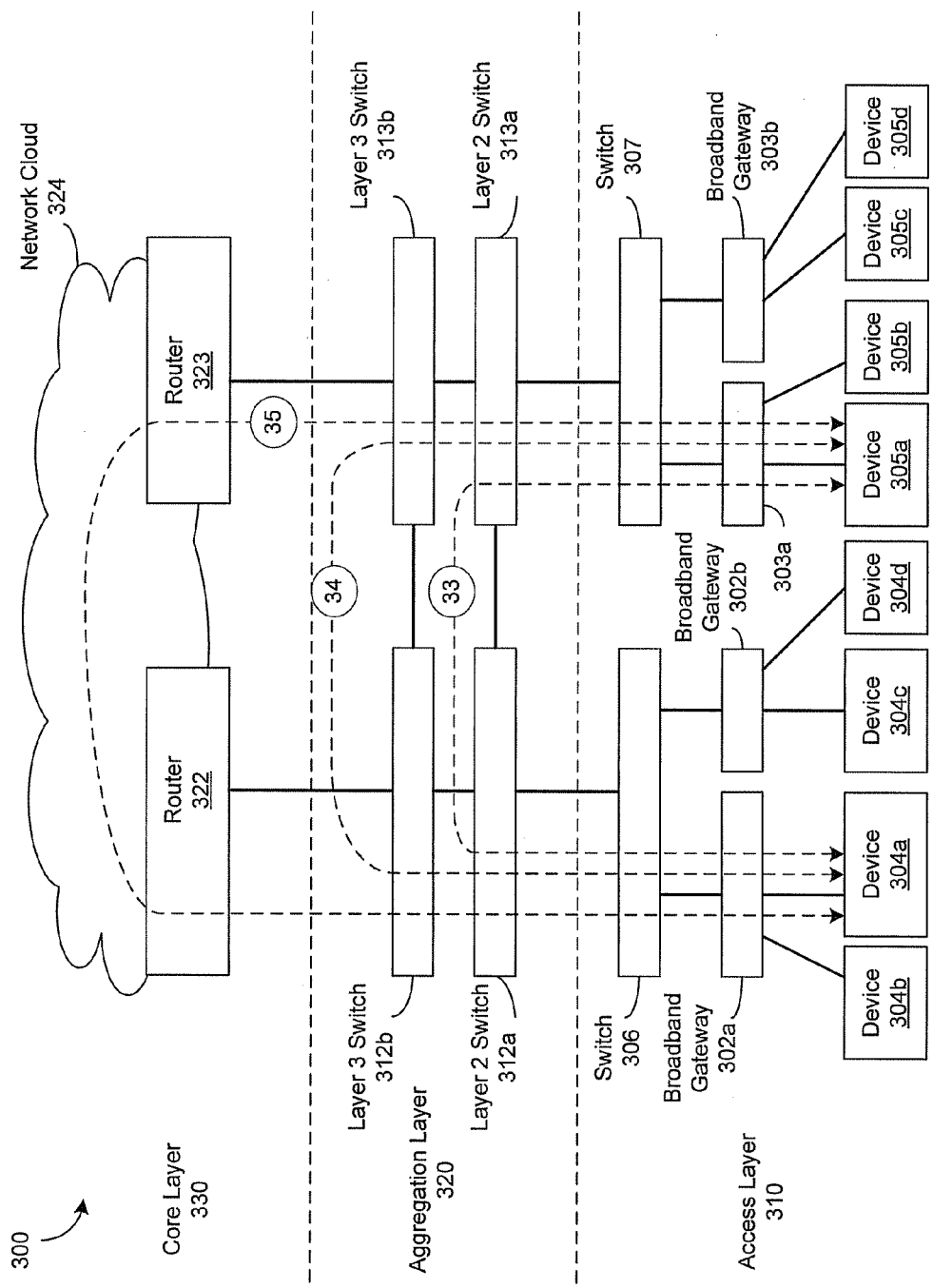

FIGS. 3A-3B are block diagrams that illustrate exemplary peer-to-peer communications, in accordance with embodiments of the invention. These scenarios are provided by way of exemplary illustration and not of limitation. Referring to each of FIGS. 3A-3B, there is shown a hierarchical network topology 300. The hierarchical network topology 300 may comprise an access layer 310, an aggregation layer 320 and a core layer 330. The access layer 310 may be substantially similar to the access layer 110a in FIG. 1. The aggregation layer 320 may be substantially similar to the aggregation layer 110b in FIG. 1. The core layer 330 may be substantially similar to the core layer 110c in FIG. 1.

The access layer 310 may comprise a plurality of devices of which devices 304a, 304b, 304c, 304d, 305a, 305b, 305c, 305*d* are illustrated, a plurality of gateways of which broadband gateways 302*a*, 302*b*, 303*a*, 303*b* are illustrated and a plurality of access layer network components of which switches 306, 307 are illustrated. The switch 306 may communicate with a plurality of broadband gateways such as the broadband gateways 302*a*, 302*b*. The switch 307 may communicate with a plurality of broadband gateways such as the broadband gateways 303*a*, 303*b*. The devices 304*a*, 304*b* may be serviced by the broadband gateway 302*a*. The devices 304*c*, 304*d* may be serviced by the broadband gateway 302*b*. The devices 305*a*, 305*b* may be serviced by the broadband gateway 303*a*. The devices 305*c*, 305*d* may be serviced by the broadband gateway 303*b*. The access layer 310 may provide connections for the broadband gateways 302*a*, 302*b*, 303*a*, 303*b* to the aggregation layer 320. The access layer 310 may ensure that packets are properly delivered to the devices 304*a*, 304*b*, 304*c*, 304*d*, 305*a*, 305*b*, 305*c*, 305*d*.

The aggregation layer 320 may comprise a plurality of interconnected layer 2 and/or layer 3 network components of which layer 2 switches 312*a*, 313*a* and layer 3 switches 312*b*, 313*b* are illustrated. The network components such as the layer 2 switches 312*a*, 313*a* and/or the layer 3 switches 312*b*, 313*b* in the aggregation layer 320 may provide connections between the access layer 310 and the core layer 330. The aggregation layer 320 may ensure that packets are properly routed to their destinations.

The core layer 330 may comprise a plurality of high-speed network components and/or resources of which routers 322, 323 and a network cloud 324 are illustrated. The network cloud 324 may comprise, for example, an Internet cloud. The network cloud 324 may be associated with one or more network access service providers such as the network access service providers 120. The core layer 330 may comprise other network components such as, for example, high-speed switches and/or multiplexers (not shown). The core layer 330 may provide connections for the aggregation layer 320 to, for example, various servers (not shown) associated with corresponding network access service providers such as the network access service providers 120 and/or corresponding content providers such as the content providers 130. The core layer 330 may ensure that packets are reliably delivered with high speed.

FIG. 3A illustrates scenarios in which the broadband gateway 302*a* may be operable to establish communication links that may bypass core layer network components and resources such as the routers 322, 323 and the network cloud 324 for enabling peer-to-peer communications between the device 304*a* and the device 304*b* and/or between the device 304*a* and the device 304*c*. The devices 304*a*, 304*b* may be substantially similar to the devices 104 in FIG. 1. The devices 304*c*, 304*d* may be substantially similar to the devices 105 in FIG. 1. The broadband gateway 302*a* may be substantially similar to the broadband gateway 102 in FIG. 1. The broadband gateway 302*b* may be substantially similar to the broadband gateway 103 in FIG. 1. In this regard, for example, a peer-to-peer communication link such as the communication link 30, which may comprise access layer network components and/or resources such as the switch 306, may be established between the device 304*a* and the device 304*b*. Without the established communication link such as the communication link 30, the packets for the peer-to-peer communications between the device 304*a* and the device 304*b* would have to travel via the communication link 32 which may comprise network components and/or resources in the access layer 310, the aggregation layer 320 and the core layer 330. A peer-to-peer communication link such as the communication link 31, which may comprise access layer network components and/or resources such as the switch 306, may also be established. Without the established communication link such as the communication link 31, the packets for the peer-to-peer communications between the device 304*a* and the device 304*c* would have to travel via the communication link 36 which may comprise network components and/or resources in the access layer 310, the aggregation layer 320 and the core layer 330. In this regard, the communication link 30 is a short peer-to-peer communication link which is shorter than the communication link 32. The communication link 31 is a short peer-to-peer communication link which is shorter than the communication link 36.

FIG. 3B illustrates a scenario in which the broadband gateway 302*a* may be operable to establish a communication link which may bypass core layer network components and resources such as the routers 332, 323 and the network cloud 324 for enabling peer-to-peer communications between the device 304*a* and the device 305*a*. The devices 304*a*, 304*b* may be substantially similar to the devices 104 in FIG. 1. The devices 305*a*, 305*b* may be substantially similar to the devices 105 in FIG. 1. The broadband gateway 302*a* may be substantially similar to the broadband gateway 102 in FIG. 1. The broadband gateway 303*a* may be substantially similar to the broadband gateway 103 in FIG. 1. In this regard, for example, a peer-to-peer communication link such as the communication link 33 which may comprise access layer network components and/or resources such as the switches 306, 307 and aggregation layer network components and/or resources such as the layer 2 switches 312*a*, 313*a* may be established. A peer-to-peer communication link such as the communication link 34 which may comprise access layer network components and/or resources such as the switches 306, 307 and aggregation layer network components and/or resources such as the layer 2 switches 312*a*, 313*a* and the layer 3 switches 312*b*, 313*b* may also be established. Without the established communication link such as the communication link 33 or the communication link 34, the packets for the peer-to-peer communications between the device 304*a* and the device 305*a* would have to travel via the communication link 35 which may comprise network components and/or resources in the access layer 310, the aggregation layer 320 and the core layer 330. In this regard, the communication link 33 or the communication 34 is a short peer-to-peer communication link which is shorter than the communication link 35.

In the exemplary embodiments of the invention illustrated in FIGS. 3A-3B, the established peer-to-peer communication links such as the communication links 30, 31, 33, 34 are shown, the two switches 306, 307 in the access layer 310 are shown, the two layer 2 switches 312*a*, 313*a* and the two layer 3 switches 312*b*, 313*b* in the aggregation layer 320 are shown, and the two routers 322, 323 in the core layer 330 are shown. Notwithstanding, the invention may not be so limited. Other established peer-to-peer communication links and/or other network components in the corresponding access layer 310, aggregation layer 320 and the core layer 330 may be illustrated without departing from the spirit and scope of various embodiments of the invention. The devices 304*a*-304*b* may communicate with multiple broadband gateways in a local or home network, the devices 304*c*-304*d* may communicate with multiple broadband gateways in a local or home network, the devices 305*a*-305*b* may communicate with multiple broadband gateways in a local or home network, and the devices 305*c*-305*d* may communicate with multiple broadband gateways in a local or home network without departing from the spirit and scope of various embodiments of the invention.

Figure 4:
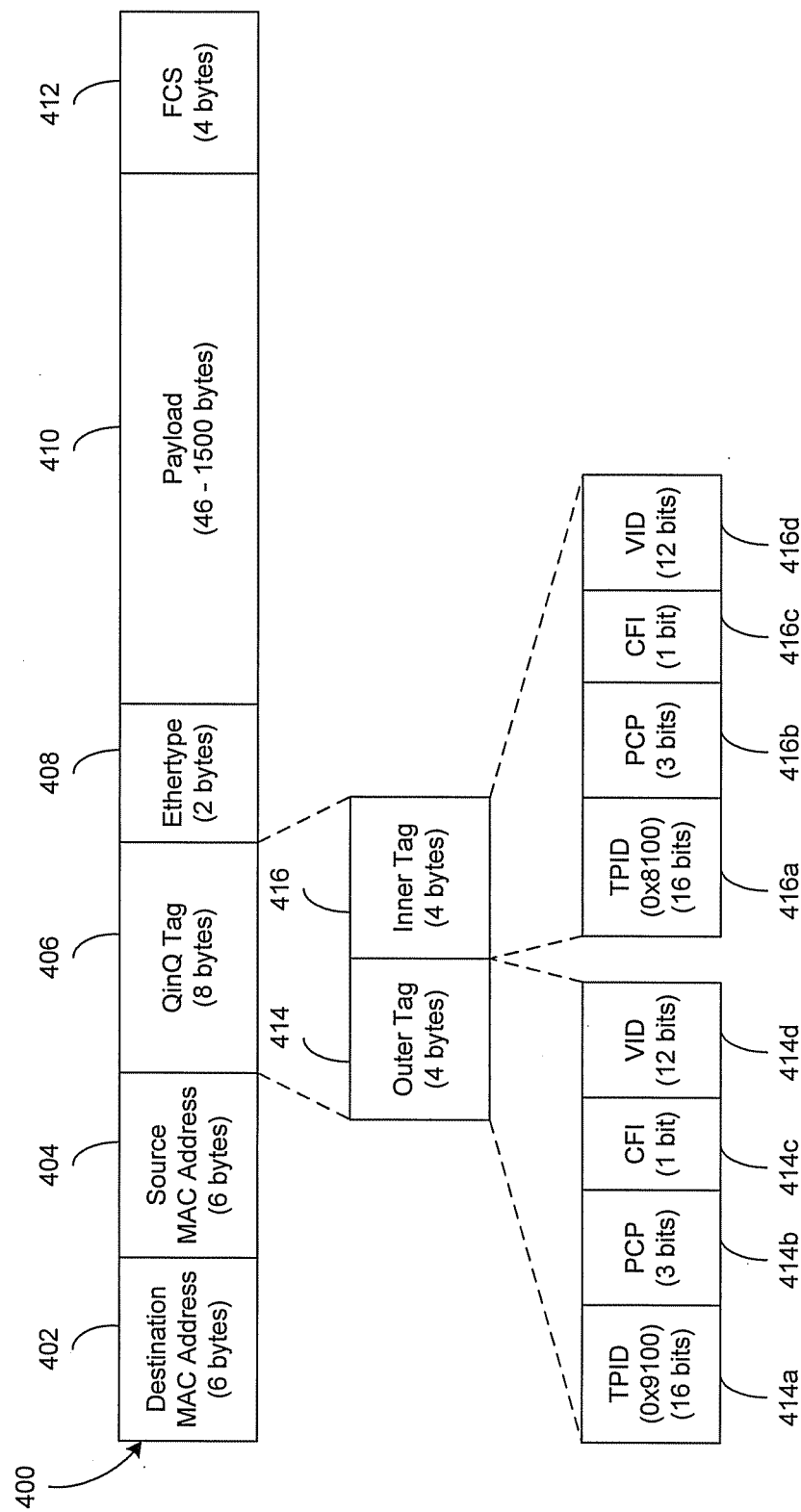
FIG. 4 is a block diagram illustrating an exemplary QinQ tagged Ethernet frame, in accordance with an embodiment of the invention.

FIG. 4 is a block diagram illustrating an exemplary QinQ tagged Ethernet frame, in accordance with an embodiment of the invention. Referring to FIG. 4, there is shown an Ethernet frame 400 with an inserted QinQ tag 406. The Ethernet frame 400 may comprise a plurality of fields of which a destination MAC address 402, a source MAC address 404, a QinQ tag 406, an ethertype 408, a payload 410 and a frame check sequence (FCS) 412 are illustrated.

The destination MAC address 402 may comprise information that may be utilized to identify the destination network node such as the device 305a that the Ethernet frame 400 is to be sent to. The source MAC address 404 may comprise information that may be utilized to identify the source network node such as the device 304a that originated the packet. The ethertype 408 may be utilized to identify the type and/or nature of the data which comprises the payload 410. The payload 410 may contain the data being transmitted. The FCS 412 may comprise, for example, a CRC or a checksum.

The inserted QinQ tag 406 is a double tag which may comprise an outer tag 414 and an inner tag 416. The outer tag 414 may comprise a tag protocol identifier (TPID) 414a, a priority code point (PCP) 414b, a canonical format indicator (CFI) 414c and a VLAN Identifier (VID) 414d. The inner tag 416 may also comprise a TPID 416a, a PCP 416b, a CFI 416c and a VID 416d. The inner tag 416 may be preserved from the original frame. The outer tag 414 may be inserted, for example, by a network node such as the broadband gateway 302a. In this regard, the outer tag 414 may be utilized to identify the frame that may be routed through a peer-to-peer communication link such as the communication link 33 for enabling peer-to-peer communications between the device 304a and the device 305a, for example.

A TPID field, such as the TPID 414a, may comprise a numerical identifier, similar to or the same as an ethertype, which may indicate the frame 400 as an IEEE 802.1 Q-tagged frame. A TPID field such as the TPID 414a or the TPID 416a may be considered as a sub-type identifier in addition to the ethertype 408. The TPID 416a of the inner tag 416 may be set to an exemplary value of 0x8100. The TPID 414a of the outer tag 414 may be set to an alternate value such as 0x9100, for example.

A PCP field, such as the PCP 414b, may indicate the frame priority level from lowest to highest, which may be used to prioritize different classes of traffic. The different classes of traffic may comprise, for example, voice, video and/or data.

A CFI field, such as the CFI 414c, may be used to provide compatibility between, for example, Ethernet and token ring networks. If the value of this field is 1, the MAC address is in non-canonical format. If the value of this field is 0, the MAC address is in canonical format. In this regard, for example, the value of the CFI 414c may be set to 0 for Ethernet switches. In other instances, a CFI field such as the CFI 414c may be used for non-Ethernet based networks such as, for example, coax based media.

A VID field, such as the VID 414d, may specify the VLAN to which the frame 400 belongs. For example, a value of 0 in this field may indicate that the frame 400 does not belong to any VLAN.

In an exemplary operation, when an QinQ tagged frame such as the frame 400 arrives at a network component associated with the communication link 33, the QinQ tag 406 may be parsed by the network component. After parsing the QinQ tag 406, the network component may be operable to direct the frame 400 to the next available network components through the communication link 33 for enabling the peer-to-peer communications between the device 304a and the device 305a, for example.

Although a QinQ tagged Ethernet frame 400 is illustrated in FIG. 4, the invention may not be so limited. Accordingly, other types of tags may be utilized and illustrated without departing from the spirit and scope of various embodiments of the invention.

Figure 5:
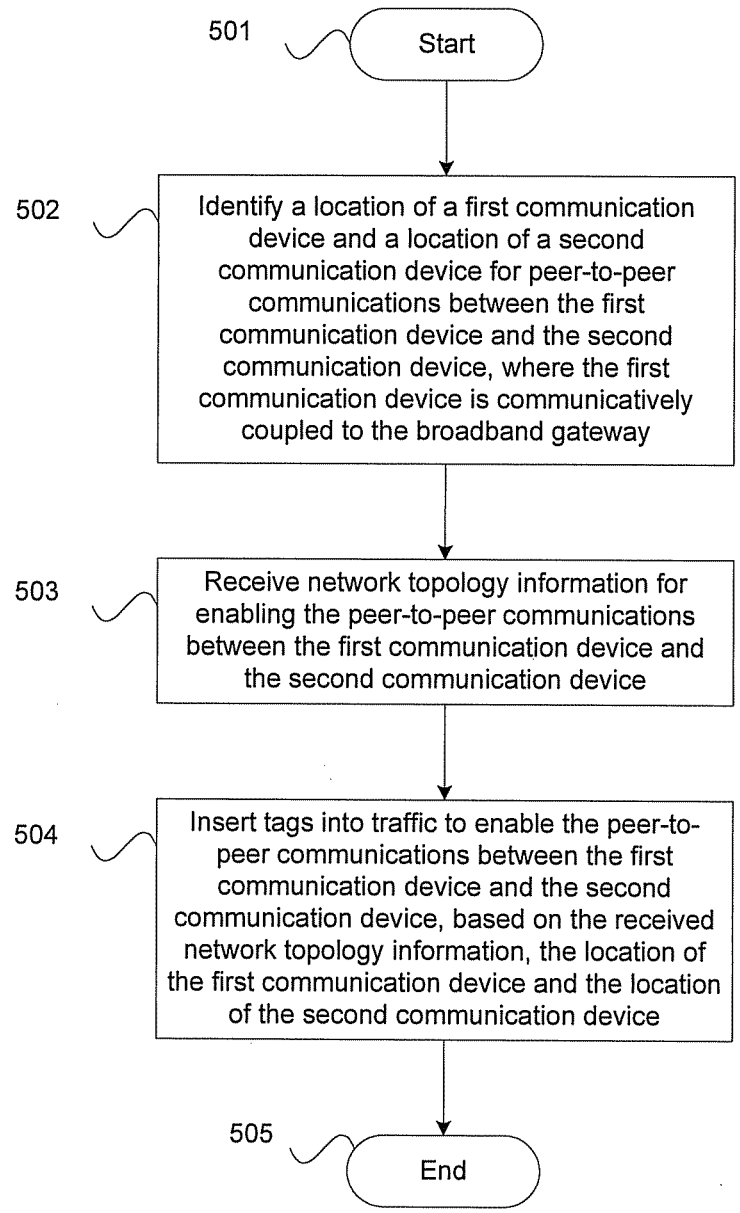
FIG. 5 is a flow chart illustrating exemplary steps for utilizing a gateway to enable peer-to-peer communications in service provider networks, in accordance with an embodiment of the invention.

FIG. 5 is a flow chart illustrating exemplary steps for utilizing a gateway to enable peer-to-peer communications in service provider networks, in accordance with an embodiment of the invention. Referring to FIG. 5, the exemplary steps start at step 501. In step 502, the broadband gateway 102 may be operable to identify a location or address of a first communication device and a location or address of a second communication device for peer-to-peer communications between the first communication device and the second communication device. The first communication device such as the device 104a is communicatively coupled to the broadband gateway 102. The second communication device may be the device 104b that is communicatively coupled to the broadband gateway 102 or the device 105a that is communicatively coupled to the other broadband gateway 103, for example. In step 503, the broadband gateway 102 may be operable to receive network topology information for enabling peer-to-peer communications between the first communication device such as the device 104a and the second communication device such as, for example, the device 105a. The network topology information may be received by the broadband gateway 102 from one or more network access service providers 120a, 120b and/or from one or more other broadband gateways such as the broadband gateway 103. For example, the network topology information may be pushed down automatically by a network access service provider such as the network access service provider 120a to the broadband gateway 102. The broadband gateway 102 may send a request to a network access service provider such as the network access service provider 120b so as to receive the network topology information from the network access service provider 120b, for example. The broadband gateway 102 may learn at least a portion of the network topology information from one or more network components such as switches in the distribution networks 110 that may be associated with one or more network access service providers 120a-120c, for example. The network topology information pertaining to a network access service provider such as the network access service provider 120c which may be associated with the broadband gateway 103 may be obtained through the broadband gateway 103, for example.

In step 504, the broadband gateway 102 may be operable to insert tags such as QinQ tags 140 into traffic that is communicated between the first communication device such as the device 104a and the second communication device such as the device 105a, based on the received network topology information, the location or address of the first communication device such as the device 104a and the location or address of the second communication device such as the device 105a. In this regard, the inserted QinQ tags 140 in the traffic may enable the peer-to-peer communications between the first communication device such as the device 304a and the second communication device such as the device 305a, and the traffic may bypass core layer network components and/or resources such as the routers 322, 323, as illustrated by a peer-to-peer communication link such as the communication link 33, for example. The exemplary steps may proceed to the end step 505.

In various embodiments of the invention, a broadband gateway 102, 200 may handle at least one physical layer connection to at least one corresponding network access service provider. In this regard, for example, the at least one physical layer connection may comprise, for example, a plurality of physical layer connections 230a-230b and the at least one corresponding network access service provider may comprise a plurality of corresponding network access service providers 220a-220b. Each of the plurality of physical layer connections 230a-230b may correspond to a respective one of the plurality of corresponding network access service providers 220a-20b.

The broadband gateway 102 may be operable to receive network topology information that may enable peer-to-peer communications between a first communication device and a second communication device through the distribution networks 110. In this regard, the first communication device may be a device such as the device 104a that is communicatively coupled to the broadband gateway 102. The second communication device may be, for example, a device such as the device 104b that is communicatively coupled to the broadband gateway 102 or a device such as the device 105a that is communicatively coupled to other broadband gateway such as the broadband gateway 103.

The broadband gateway 302a may establish a communication link such as the communication link 30 or the communication link 33, which may bypass core layer network components and/or resources such as the routers 322, 323 and the network cloud 324 to enable the peer-to-peer communications between the first communication device such as the device 304a and the second communication device such as the device 304b or the device 305a. The broadband gateway 302a may establish the peer-to-peer communication link such as the communication link 33 based on the received network topology information, a location of the first communication device such as the device 304a and a location of the second communication device such as the device 305a. In this regard, the peer-to-peer communication link such as the communication link 33 for enabling the peer-to-peer communications may be established by marking traffic between the first communication device such as the device 304a and the second communication device such as the device 305a. For example, the communication link 33 may be established by inserting tags into traffic that may be communicated between the first communication device such as the device 104a and the second communication device such as the device 305a. The network topology information may be received by the broadband gateway 302a from one or more of the plurality of network access service providers such as the network access service providers 120a, 120b and/or from one or more other broadband gateways such as the broadband gateway 303a, for example. The peer-to-peer communications may comprise, for example, content sharing, files sharing, video gaming and/or website hosting.

In an embodiment of the invention, the second communication device may be a device such as the device 104b that is also communicatively coupled to the broadband gateway 102. In this regard, for example, the first communication device such as the device 104a and the second communication device such as the device 104b may both be associated with the same network access service provider such as the network access service provider 120a during the peer-to-peer communications. In other instances, the first communication device such as the device 104a may be associated with a first network access service provider such as the network access service provider 120a while the second communication device such as the device 104b may be associated with a second network access service provider such as the network access service provider 120b, for example.

In another embodiment of the invention, the second communication device may be a device such as the device 105a that is communicatively coupled to one of other broadband gateways such as the broadband gateway 103. In this regard, for example, the first communication device such as the device 104a and the second communication device such as the device 105a may both be associated with the same network access service provider such as the network access service provider 120a during the peer-to-peer communications. In other instances, the first communication device such as the device 104a may be associated with a first network access service provider such as the network access service provider 120a while the second communication device such as the device 105a may be associated with a second network access service provider such as the network access service provider 120c, for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing a gateway to enable peer-to-peer communications in service provider networks.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a broadband gateway that is communicatively coupled to a first communication device, the broadband gateway being configured to handle at least one physical layer connection to at least one corresponding network access service provider:
receiving network topology information that represents a hierarchical network topology of a network to which said broadband gateway is coupled, said hierarchical network topology comprising a plurality of layers of nodes of said network, the plurality of layers including a core layer, an access layer comprising a plurality of nodes including said broadband gateway, and an aggregation layer providing at least one connection between said access layer and said core layer using at least a network device that operates at an open system interconnection (OSI) data link layer or network layer and that comprises a node of the aggregation layer, each of the nodes of said network being from one of the plurality of layers and comprising a network device connected within said network; and
establishing a communication link that bypasses at least one node indicated as being from said core layer using said received network topology information, to enable peer-to-peer communications between said first communication device and a second communication device, wherein said communication link is established using said network topology information, a location of said first communication device, and a location of said second communication device.

2. The method according to claim 1, further comprising establishing the communication link to bypass each node of said network identified as being from said core layer using said received network topology information.

3. The method according to claim 1, comprising marking, using said broadband gateway, traffic transmitted between said first communication device and said second communication device.

4. The method according to claim 1, comprising inserting, using said broadband gateway, a plurality of tags into traffic transmitted between said first communication device and said second communication device.

5. The method according to claim 1, comprising receiving, in said broadband gateway, said network topology information from at least one of one other broadband gateway or said at least one corresponding network access service provider.

6. The method according to claim 1, wherein:
said second communication device is communicatively coupled to said broadband gateway; and
said first communication device and said second communication device are both associated with a same network access service provider.

7. The method according to claim 1, wherein:
said second communication device is communicatively coupled to another broadband gateway; and
said first communication device and said second communication device are both associated with a same network access service provider.

8. The method according to claim 1, wherein:
said first communication device is associated with a first network access service provider;
said second communication device is communicatively coupled to said broadband gateway; and
said second communication device is associated with a second network access service provider.

9. The method according to claim 1, wherein:
said first communication device is associated with a first network access service provider;
said second communication device is communicatively coupled to another broadband gateway; and
said second communication device is associated with a second network access service provider.

10. The method according to claim 1, wherein establishing the communication link that bypasses the at least one node indicated as being from said core layer using said received network topology information, comprises establishing the communication link via the network device operating at the OSI data link layer or network layer, and bypassing the at least one connection provided between said access layer and said core layer.

11. A system for communication, the system comprising:
at least one processor, at least one circuit, or any combination thereof for use in a broadband gateway, said broadband gateway being configured to handle at least one physical layer connection to at least one corresponding network access service provider, said broadband gateway being communicatively coupled to a first communication device, and said at least one processor, said at least one circuit or any combination thereof being configured to:
receive network topology information that represents a hierarchical network topology of a network to which said broadband gateway is coupled, said hierarchical network topology comprising a plurality of layers of nodes of said network, the plurality of layers including a core layer, an access layer comprising a plurality of nodes including said broadband gateway, and an aggregation layer providing at least one connection between said access layer and said core layer using at least a network device that operates at an open system interconnection (OSI) data link layer or network layer and that comprises a node of the aggregation layer, each of the nodes of said network being from one of the plurality of layers and comprising a network device connected within said network; and
establish a communication link that bypasses at least one node indicated as being from said core layer using said received network topology information, to enable peer-to-peer communications between said first communication device and a second communication device, wherein said communication link is established using said network topology information, a location of said first communication device, and a location of said second communication device.

12. The system according to claim 11, wherein said at least one physical layer connection comprises a plurality of physical layer connections, and said at least one corresponding network access service provider comprises a plurality of corresponding network access service providers, and each of said plurality of physical layer connections corresponds to a respective one of said plurality of corresponding network access service providers.

13. The system according to claim 11, wherein said at least one processor, said at least one circuit, or any combination thereof is configured to mark traffic transmitted between said first communication device and said second communication device.

14. The system according to claim 11, wherein said at least one processor, said at least one circuit, or any combination thereof is configured to insert a plurality of tags into traffic transmitted between said first communication device and said second communication device.

15. The system according to claim 11, wherein said at least one processor, said at least one circuit, or any combination thereof is configured to receive said network topology information from at least one of one other broadband gateway or said at least one corresponding network access service provider.

16. The system according to claim 11, wherein:
said second communication device is communicatively coupled to said broadband gateway; and
said first communication device and said second communication device are both associated with a same network access service provider.

17. The system according to claim 11, wherein:
said second communication device is communicatively coupled to another broadband gateway; and
said first communication device and said second communication device are both associated with a same network access service provider.

18. The system according to claim 11, wherein:
said first communication device is associated with a first network access service provider;
said second communication device is communicatively coupled to said broadband gateway; and
said second communication device is associated with a second network access service provider.

19. The system according to claim 11, wherein:
said first communication device is associated with a first network access service provider;
said second communication device is communicatively coupled to another broadband gateway; and
said second communication device is associated with a second network access service provider.

20. A system for communication, the system comprising:
a broadband gateway comprising:
processing circuitry configured to obtain network topology information that represents a hierarchical network topology of a network to which said broadband gateway is coupled, said hierarchical network topology comprising a plurality of layers of nodes of said network, the plurality of layers including a core layer, an access layer comprising a plurality of nodes including said broadband gateway, and an aggregation layer providing at least one connection between said access layer and said core layer using at least a network device that operates at an open system interconnection (OSI) data link layer or network layer and that comprises a node of the aggregation layer, each of the nodes of said network being from one of the plurality of layers and comprising a network device connected within said network;
processing circuitry configured to obtain a first address of a first communication device and a second address of a second communication device; and
processing circuitry configured to enable a peer-to-peer communication between said first communication device and said second communication device using said network topology information, said first address, and said second address, wherein said peer-to-peer communication bypasses a node indicated as being from said core layer using said obtained network topology information.

* * * * *